US012801104B2

(12) United States Patent
Montestruque et al.

(10) Patent No.: US 12,801,104 B2
(45) Date of Patent: Nov. 17, 2026

(54) SYSTEMS AND METHODS FOR MONITORING AND MANAGEMENT OF A FLUID INFRASTRUCTURE NETWORK

(71) Applicant: HYDRODIGITAL, LLC, South Bend, IN (US)

(72) Inventors: Luis Montestruque, South Bend, IN (US); Timothy P. Ruggaber, South Bend, IN (US)

(73) Assignee: HYDRODIGITAL, LLC, South Bend, IN (US)

( * ) Notice: Subject to any disclaimer, the term of this patent is extended or adjusted under 35 U.S.C. 154(b) by 403 days.

(21) Appl. No.: 18/686,444

(22) PCT Filed: Oct. 11, 2022

(86) PCT No.: PCT/US2022/046211

§ 371 (c)(1),
(2) Date: Feb. 26, 2024

(87) PCT Pub. No.: WO2023/064231

PCT Pub. Date: Apr. 20, 2023

(65) Prior Publication Data

US 2025/0123607 A1 Apr. 17, 2025

Related U.S. Application Data

(60) Provisional application No. 63/254,175, filed on Oct. 11, 2021.

(51) Int. Cl.

*G05B 15/02* (2006.01)
*G05B 13/02* (2006.01)
*G05B 13/04* (2006.01)

(52) U.S. Cl.

CPC ......... *G05B 15/02* (2013.01); *G05B 13/0265* (2013.01); *G05B 13/042* (2013.01); *G05B 13/048* (2013.01)

(58) Field of Classification Search

CPC ................................................ G01W 2203/00
See application file for complete search history.

(56) References Cited

U.S. PATENT DOCUMENTS

2003/0216873 A1* 11/2003 Schutzbach ............. G01F 15/00 702/50
2013/0338920 A1* 12/2013 Pasken .................... G01W 1/10 702/3

(Continued)

FOREIGN PATENT DOCUMENTS

EP 4407481 B1 6/2026
EP 4402574 B1 8/2026

OTHER PUBLICATIONS

European Search Report & Opinion mailed on Oct. 15, 2024, for European Divisional Patent Application No. 24171902.0, pp. 8.

(Continued)

*Primary Examiner* — Nathan L Laughlin
(74) *Attorney, Agent, or Firm* — Harmohinder S. Bedi

(57) ABSTRACT

Fluid infrastructure management systems and methods are described. An exemplar method includes: (1) obtaining, inside a server and a remote telemetry unit, a digital twin model providing one or more estimates of a flow attribute inside a fluid infrastructure item; (2) receiving a forecast of an environmental condition around an area surrounding the sensor; (3) estimating, at the server and using the forecast and one of the digital twin models, flow attribute to produce one or more server's estimated flow attribute values; (4) obtaining, using the sensor and at the remote telemetry unit, the sensor measurement of the flow attribute; and reporting or more of the server's estimated flow attribute values as being or being an estimate of the sensor measurement, if the server does not receive from the remote telemetry unit the sensor measurement.

20 Claims, 7 Drawing Sheets

(56) References Cited

U.S. PATENT DOCUMENTS

| | | | | |
|---|---|---|---|---|
| 2014/0052421 | A1 | 2/2014 | Allen et al. | |
| 2016/0125316 | A1 | 5/2016 | Kadav et al. | |
| 2016/0378123 | A1* | 12/2016 | Montestruque | G05B 15/02 700/282 |
| 2017/0270621 | A1 | 9/2017 | Fleming et al. | |
| 2019/0354873 | A1* | 11/2019 | Pescarmona | G01W 1/02 |
| 2021/0017999 | A1* | 1/2021 | Fowler | F04D 1/06 |
| 2021/0157312 | A1 | 5/2021 | Cella et al. | |

OTHER PUBLICATIONS

International Search Report and Written Opinion mailed on Mar. 8, 2023 for International Application No. PCT/US2022/046211 filed on Oct. 11, 2022, 21 pages.

Communication under Rule 71(3) EPC (Intention to Grant), European Patent Office, in EP Application No. 22 881 628.6, dated May 13, 2026 (5 pages).

Communication under Rule 71(3) EPC (Intention to Grant), European Patent Office, in EP Application No. 24 171 902.0 dated Apr. 14, 2026 (5 pages).

Communication pursuant to Article 94(3) EPC (Office action), European Patent Office, in EP Application No. 24 171 902.0 dated Dec. 2, 2025 (4 pages).

Supplementary European Search Report and Opinion mailed on Jan. 9, 2025, for European Patent Application No. 22881628.6, 8 pages.

* cited by examiner

SYSTEMS AND METHODS FOR MONITORING AND MANAGEMENT OF A FLUID INFRASTRUCTURE NETWORK

RELATED CASE

Related Application

This patent application is a National Stage Application of International Application No. PCT/US2022/046211 filed on Oct. 11, 2022 which further claims priority to U.S. provisional patent application No. 63/254,175, filed on Oct. 11, 2021, which is incorporated herein by reference for all purpose.

FIELD

The present teachings and arrangements relate generally to novel systems and methods for management of a fluid infrastructure network. More particularly, the present teachings and arrangements relate to using a digital twin for enabling management by monitoring flow attributes within the fluid infrastructure network.

BACKGROUND

Fluid infrastructure network includes conveyance, pumps, diversions, and storage tanks and wells, treatment units, for delivering or processing fluid or water. Examples of fluid networks include sewage system, groundwater well system, aquafer, aqueduct network and rain harvesting system. These networks are designed to collect and deliver fluid streams and sometimes treat the delivered fluid streams. By way of example, infrastructure networks dedicated to collecting and delivering treated water for drinking and agricultural and industrial use must be properly managed as they are integral to human life. Unfortunately, regardless of whether fluid treatment is necessary or not, management of these networks is time consuming, arduous, and financially burdensome.

What is, therefore, required are novel systems and processes for management of fluid infrastructure network systems.

SUMMARY

To achieve the foregoing, the present arrangements and teachings offer novel systems and methods, using a digital twin, for enabling management by monitoring flow attributes within a fluid infrastructure network.

In one aspect, the present teachings provide fluid infrastructure network management methods. One such exemplar management method includes: (1) obtaining a copy of a digital twin model at a server; (2) receiving, for an instance in time or for a period of time, a forecast of an environmental condition around an area surrounding a sensor; (3) estimating at the server, using the forecast of the environmental condition and the copy of the digital twin model, flow attribute inside the fluid infrastructure item for the instance in time or for the period of time to produce one or more server's estimated flow attribute values; (4) receiving or obtaining, from the sensor inside a remote telemetry unit, the sensor measurement of the flow attribute inside the fluid infrastructure item; and (5) reporting, after lapse of the instance in time or after lapse of the period of time, one or more of the server's estimated flow attribute values as being or being an estimate of the sensor measurement for the instance in time or for the period of time, if the server does not receive from the remote telemetry unit the sensor measurement. In one preferred embodiment of the present teachings, the above-mentioned reporting element is carried out, if the remote telemetry unit determines that an absolute value of a difference between the sensor measurement and one of the remote telemetry unit's estimated flow attribute values is equal to or less than a predefined threshold tolerance value, or determines that the sensor measurement, for the instance in time or for the period of time, falls within a predefined confidence interval of the remote telemetry unit's multiple estimated flow attribute values of the fluid infrastructure item.

In another aspect, the present teachings provide another type of fluid infrastructure network management methods. In this aspect, the remote telemetry unit and a sensor are remotely located to the server, the remote telemetry unit is communicatively coupled to a sensor that measures flow attribute inside the fluid infrastructure item such that the remote telemetry unit receives from the sensor a sensor measurement.

Further, an exemplar method of this aspect includes: (1) obtaining, inside each of the server and inside the remote telemetry unit, a digital twin model providing, for an instance in time or for a period of time, one or more estimates of a flow attribute inside a fluid infrastructure item; (2) receiving, for the instance in time or for the period of time, a forecast of an environmental condition around an area surrounding the sensor; (3) estimating, at the remote telemetry unit and using the forecast of the environmental condition and one of the digital twin models, flow attribute inside the fluid infrastructure item for the instance in time or for the period of time to produce one or more remote telemetry unit's estimated flow attribute values; (4) estimating, at the server and using the forecast of the environmental condition and one of the digital twin models, flow attribute inside the fluid infrastructure item for the instance in time or for the period of time to produce one or more server's estimated flow attribute values; (5) obtaining, using the sensor and at the remote telemetry unit, the sensor measurement of the flow attribute inside the fluid infrastructure item; (6) comparing, at the remote telemetry unit, the sensor measurement with one or more of the remote telemetry unit's estimated flow attribute values; (7) reporting, for the instance in time or for the period of time, one or more of the server's estimated flow attribute values as being or being an estimate of the sensor measurement, if an absolute value of a difference between the sensor measurement and one of the remote telemetry unit's estimated flow attribute values is equal to or less than a predefined threshold tolerance value, or if the sensor measurement, for the instance in time or for the period of time, falls within a predefined confidence interval of the remote telemetry unit's multiple estimated flow attribute values.

If, however, the absolute value of the difference between the sensor measurement and one of the remote telemetry unit's estimated flow attribute values is greater than the predefined threshold tolerance value, or if the sensor measurement, for the instance in time or for the period of time, falls outside the predefined confidence interval of the remote telemetry unit's multiple estimated flow attribute values, then the above-mentioned management methods of the present teachings, preferably, further comprise conveying, from the remote telemetry unit to the server, the sensor measurement for the instance in time or for the period of time.

Next the method of this aspect, preferably, includes an element of receiving, after lapse of the instance in time or of the period of time and at the server, information regarding a realized environmental condition that is realized in the area surrounding the sensor for the instance in time or during the period of time.

Based upon the information regarding the realized environmental condition and the digital twin model present at the server, the management methods of the present teachings determine one or more server's new estimated flow attribute values for the instance in time or for the period of time. This allows for comparing, at the server, the sensor measurement with one or more of the server's new estimated flow attribute values.

The management methods of the present teachings then proceed to an element of maintaining the digital twin model at the server, if the absolute value of the difference between the sensor measurement and one or more of the server's new estimated flow attribute values is equal to or greater than a check predefined threshold tolerance value, or if the sensor measurement, for the instance in time or for the period of time, falls outside a check predefined confidence interval of multiple of the server's new estimated flow attribute values.

If, however, the absolute value of the difference between the sensor measurement and one of the server's new estimated flow attribute is less than a check predefined threshold tolerance value, or if the sensor measurement, for the instance in time or for the period of time, falls inside the check predefined confidence interval of multiple of the server's new estimated flow attribute values, then the methods of the present teachings, preferably, proceed to an element of obtaining inside each of the server and the remote telemetry unit, a new digital twin model that is different from the digital twin model. In other words, the original digital twin model is updated, recalibrated, or reconstructed.

In yet another aspect, the present teachings provide yet another type of fluid infrastructure network management methods. In this aspect, the remote telemetry unit is communicatively coupled to a sensor, which measures a flow attribute inside the fluid infrastructure item such that the remote telemetry unit receives from the sensor a sensor measurement of the flow attribute. One such exemplar method of this aspect includes: (1) obtaining, inside a remote telemetry unit, a digital twin model providing, for an instance in time or for a period of time, one or more estimates of the flow attribute inside the fluid infrastructure item; (2) receiving a forecast of an amount of precipitation that is expected to be received in an area surrounding the sensor at the instance in time or during the period of time; (3) estimating at the remote telemetry unit, for the instance in time or for the period of time, based upon the forecast of the amount of precipitation and the digital twin model, one or more remote telemetry unit's estimated flow attribute values for the fluid infrastructure item; (4) receiving, at the remote telemetry unit, the sensor measurement for the instance in time or for the period of time and receiving an amount of realized precipitation that is realized in an area surrounding the sensor for the instance in time or during the period of time; (5) comparing the sensor measurement with one or more of the remote telemetry unit's estimated flow attribute values; (6) determining at the remote telemetry unit, using the digital twin and the amount of realized precipitation, one or more new remote telemetry unit's estimated flow attribute values for the instance in time or for the period of time, if the absolute value of a difference between the sensor measurement and one of the remote telemetry unit's estimated flow attribute values is greater than a predefined threshold tolerance value, or if the sensor measurement, for the instance in time or for the period of time, falls outside a predefined confidence interval of the remote telemetry unit's multiple estimated flow attribute values; (6) comparing, at the remote telemetry unit, the sensor measurement with one or more of the new remote telemetry unit's estimated flow attribute values; and (7) maintaining the digital twin model at the server, if the absolute value of the difference between the sensor measurement and one of the new remote telemetry unit's estimated flow attribute values is equal to or greater than a check predefined threshold tolerance value, or if the sensor measurement, for the instance in time or for the period of time, falls outside a check predefined confidence interval of multiple of the new remote telemetry unit's estimated flow attribute values.

In yet another aspect, the present arrangements provide fluid infrastructure network management systems. One such exemplar management system comprises: (1) multiple sensors, each of which is designed to measure a flow attribute inside a fluid infrastructure item that is part of a fluid infrastructure network; (2) multiple remote telemetry units, each of which is communicatively coupled to at least one of the sensors and comprises: (i) a battery for providing power, (ii) a sensor module for communicatively coupling to the sensor and receiving the sensor measurement, (iii) a memory for storing sensor measurements and one of a digital twin model that provides, for an instance in time or for a period of time, one or more remote telemetry unit's estimated flow attribute values for the infrastructure item, (iv) a communications module connected to a network and designed to transmit information from the remote telemetry unit to the network, and (v) a microprocessor programmed to implement instructions comprising: (a) receiving, for the instance in time or for the period of time and using the communication module, a forecast of an environmental condition around an area surrounding the sensor; (b) estimating, for the instance in time or for the period of time, and using the forecast of the environmental condition and the digital twin model, one or more remote telemetry unit's estimated flow attribute values inside the fluid infrastructure item; (c) obtaining, using the sensor, a sensor measurement inside the fluid infrastructure item; (d) comparing the sensor measurement with one or more of the remote telemetry unit's estimated flow attribute values; (e) conveying, from the remote telemetry unit to a network, the sensor measurement for the instance in time or for the period of time, if the absolute value of the difference between the sensor measurement and one of the remote telemetry unit's estimated flow attribute values is greater than a predefined threshold tolerance value, or if the sensor measurement, for the instance in time or for the period of time, falls outside a predefined confidence interval of the remote telemetry unit's multiple estimated flow attribute values.

The exemplar management system also comprises a server communicatively coupled, through the network, to multiple of the remote telemetry units and having stored therein multiple digital twin models, each of which is a copy of a digital twin model stored in each of the remote telemetry units, and wherein each of the remote telemetry units and each of the sensors are remotely located to the server, wherein the server is programmed to implement instructions comprising: (a) receiving from the remote telemetry unit through the network, the sensor measurement for the instance in time or for the period of time; (b) receiving, after lapse of the instance in time or after lapse of the period of time and at the server, information regarding a realized environmental condition that was realized in the area surrounding the sensor for the instance in time or during the period of time; (c) determining, based upon the information regarding the realized environmental condition and the digital twin model present at the server, one or more server's new estimated flow attribute values inside the fluid infrastructure item for the instance in time or for the period of time; (d) comparing, at the server, the sensor measurement with one or more of the server's new estimated flow attribute values; (e) maintaining the digital twin model at the server, if an absolute value of the difference between the sensor measurement and one of the server's new estimated flow attribute values is equal to or greater than a check predefined threshold tolerance value, or if the sensor measurement, for the instance in time or for the period of time, falls outside a check predefined confidence interval of multiple of the server's new estimated flow attribute values.

In yet another aspect, the present arrangements provide another type of fluid infrastructure network management systems. One such exemplar system comprises: (1) multiple sensors, each of which is designed to generate a sensor measurement inside a fluid infrastructure item; (2) multiple remote telemetry units, each of which is communicatively coupled to at least one of the sensors and has stored therein one of a digital twin model; (3) a server communicatively coupled to multiple of the remote telemetry units and has stored therein multiple digital twin models such that one digital twin model on the server is substantially similar to the digital twin model stored on the remote telemetry units; (4) a network through which the multiple remote telemetry units are communicatively coupled to the server that includes a microprocessor being programmed with instructions comprising: (a) receiving, for the instance in time or for the period of time, a forecast of an environmental condition around an area surrounding at least one of the sensors; (b) estimating, at the server and using the forecast of the environmental condition and one of the digital twin models, flow attribute inside the fluid infrastructure item for the instance in time or for the period of time to produce one or more server's estimated flow attribute values; (c) receiving or obtaining, from the sensor and at the remote telemetry unit, the sensor measurement of the flow attribute inside the fluid infrastructure item; and (d) reporting, after lapse of the instance in time or after lapse of the period of time, one or more of the server's estimated flow attribute values as being or being an estimate of the sensor measurement for the instance in time or for the period of time, if the server does not receive from the remote telemetry unit the sensor measurement.

The systems and methods of operation and effective compositions obtained from the present teachings and arrangements, however, together with additional objects and advantages thereof, will be best understood from the following descriptions of specific embodiments when read in connection with the accompanying figures.

DETAILED DESCRIPTION

Figure 1:
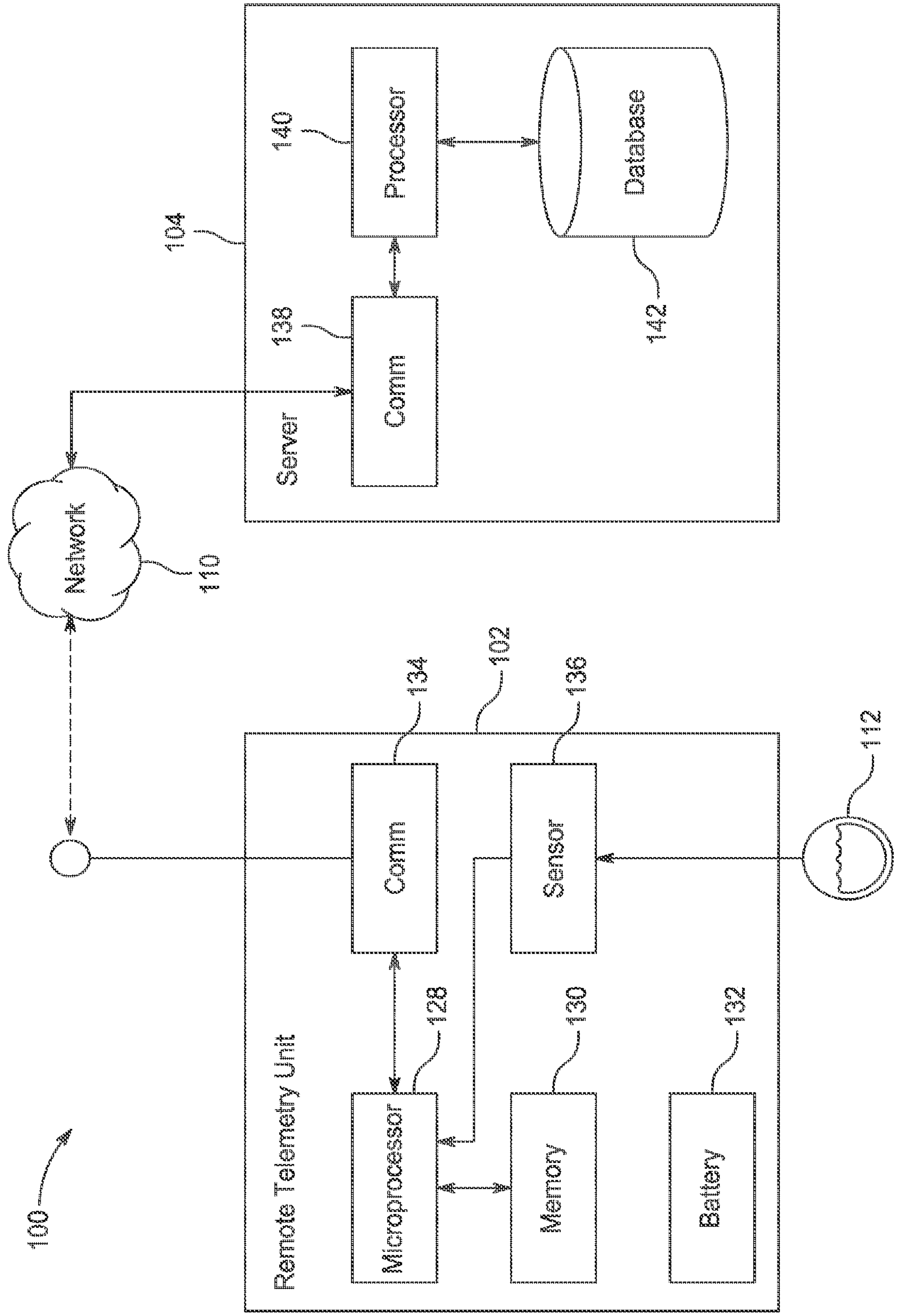
FIG. 1 shows a fluid infrastructure network management system, according to one embodiment of the present arrangements, including a server that is communicatively coupled to a remote telemetry unit that is, in turn, communicatively coupled to a sensor.

In the following description, numerous specific details are set forth in order to provide a thorough understanding of the present teachings and arrangements. It will be apparent, however, to one skilled in the art that the present teachings and arrangements may be practiced without limitation to some or all these specific details. In other instances, well-known process steps have not been described in detail in order to not unnecessarily obscure the present teachings and arrangements.

Effective monitoring systems and methods for management of fluid infrastructure network are crucial for implementing real time decision support systems. To this end, the present arrangements and present teachings realize that while advances in sensing, battery technology and cellular communication have made the installation and operation of such monitoring systems more cost effective and robust, little has been done to extend their battery life. Particularly when transmission of real time sensor measurements is deemed paramount, conventional monitoring systems suffer from constantly expending energy to collect and transmit real-time sensor data that undesirably requires replacing batteries that power communication modules such as cellular modems.

The present arrangements and present teachings solve this "constantly-replacing-batteries" problem by, in preferred embodiments, using a synchronized machine-learning model, which is alternately referred to as a digital twin model. In one configuration, one of the digital twin models operates on a remote telemetry unit ("RTU") and another of the digital twin models operates on a server, which is communicatively coupled to and aggregates data from multiple RTUs distributed within a fluid infrastructure network. In this configuration, at least one RTU is connected to a sensor and the RTUs and the sensors are disposed at monitoring locations of fluid infrastructure network that are remote to the server. As a result, the server may be thought of as a central processor that aggregates remotely collected data and digital twins for management of the fluid network. Representative fluid infrastructure item. according to the present arrangements and present teachings, includes conduit, reservoir, orifice, weir, pump and wastewater treatment plant.

According to the present teachings, the digital twin model is used to produce estimates of the sensor measurements at an RTU and the server. In one embodiment of the present teachings, the RTU compares an actual sensor measurement with an estimate obtained from the digital twin model (operating at the RTU). If the actual sensor measurement and the estimate from the digital twin model are within a tolerable range, then the actual sensor measurement is not conveyed from the RTU (where it resides) to the server. In this circumstance, the server relies upon the digital twin model stored thereon and assumes that an estimate of sensor measurement obtained from the digital twin model (at the server) to be the actual sensor measurement. Obviating the need to transmit the actual sensor measurement from the RTU to the server represents an energy saving features of the present teachings that is not realized by conventional monitoring systems and methods. Furthermore, the energy saving features allows the present arrangements and present teachings to effectively monitor fluid infrastructure networks for several years without replacing the batteries powering the communication module.

Further still, the server's ability, by relying on the digital twin model, to provide an acceptable estimate of the actual sensor measurement allows the present arrangements and present systems to offer cost effective real-time decision support to effectively manage the fluid infrastructure network.

It is important that the digital twin models, present at the RTU and at the server, are synchronized to realize these advantages (e.g., energy savings and/or real-time responsive measures) offered by the digital twin models. To this end, if the actual sensor measurement and the estimate from the digital twin model are not within a tolerable range, then the actual sensor measurement is conveyed from the RTU to the server and a process to reconcile is initiated. At the server, information regarding a realized environmental condition (e.g., amount of precipitation) is received and is used to obtain an estimate of the sensor measurement from the digital twin model. If the difference between the actual sensor measurement and the estimate from the digital twin model, at the server, is outside a tolerable range, then the realized environmental condition is deemed an outlier. In this situation, the present teachings consider the digital twin models, at the RTU and at the server, to be synchronized and therefore, retains the digital twin model at the server.

If, however, the difference between the actual sensor measurement and the estimate of the sensor measurement, obtained from the digital twin model at the server, is within the tolerable range, then the digital twin models, at the RTU and at the server, are considered by the present teachings not to be synchronized. Accordingly, the digital twin model at the server is updated or reconstructed so that it is synchronized with the digital twin model present at the RTU.

The present teachings not only recognize the need for energy savings and real time response measures, but also provides structural provisions and process features for synchronizing the underlying digital twin models, at the RTU and at the server and that enable the advantages of energy savings and real time response measures so that those advantages continue and are not disrupted. These structural provisions and process features are described in detail below.

FIG. 1 shows a fluid infrastructure network management system 100, according to one embodiment of the present arrangements and that is designed to monitor a fluid infrastructure. Fluid infrastructure monitoring system 100 includes an RTU 102 and a server 104 that are communicatively coupled through a communication network 110 (e.g., the Internet or a satellite). Further, RTU 102 is powered by a battery 132 to carry out a wide variety of functions.

RTU 102 includes an RTU microprocessor 128 that is communicatively coupled to an RTU communication module 134, which is in turn communicatively coupled to network 110. Inside RTU 102, an RTU memory module is bi-directionally coupled to RTU microprocessor 128. A sensor module 136 receives data from a sensor 112 that is configured to measure a flow attribute of a remote fluid infrastructure item, which is located remotely with respect to server 104.

According to FIG. 1, a sensor measurement taken by sensor 112 is conveyed from sensor module 136, through a communicative coupling, to RTU microprocessor 128. Either after processing or without processing, a computed value relying on the sensor measurement or the sensor measurement itself is conveyed from RTU microprocessor 128 to RTU communication module 134.

In an alternate embodiment of the present fluid infrastructure monitoring system, sensor module 136 is directly coupled to RTU communication module 134 and a sensor measurement, taken at sensor 112, does not have to go through RTU microprocessor 128 to arrive at RTU communication module 134. In this alternate arrangement, the sensor measurement, taken at sensor 112, is conveyed from sensor module 136 directly to RTU communication module 134. Regardless of whether RTU microprocessor 128 is involved in communicating a sensor measurement, taken at sensor 112, the sensor measurement is conveyed from RTU communication module 134 through a network to server 104.

Server 104 includes a server communications module 138 that is bi-directionally coupled to a server processor 140, which is in turn bi-directionally coupled to a database 142. Server communications module 138, like RTU communication module 134, is communicatively coupled to network 110. In connection with a sensor measurement, taken at sensor 112, server communications module 138 receives the sensor measurement from network 110 and forwards it to server processor 140 that uses it in a comparison, for example, explained below.

Figure 2:
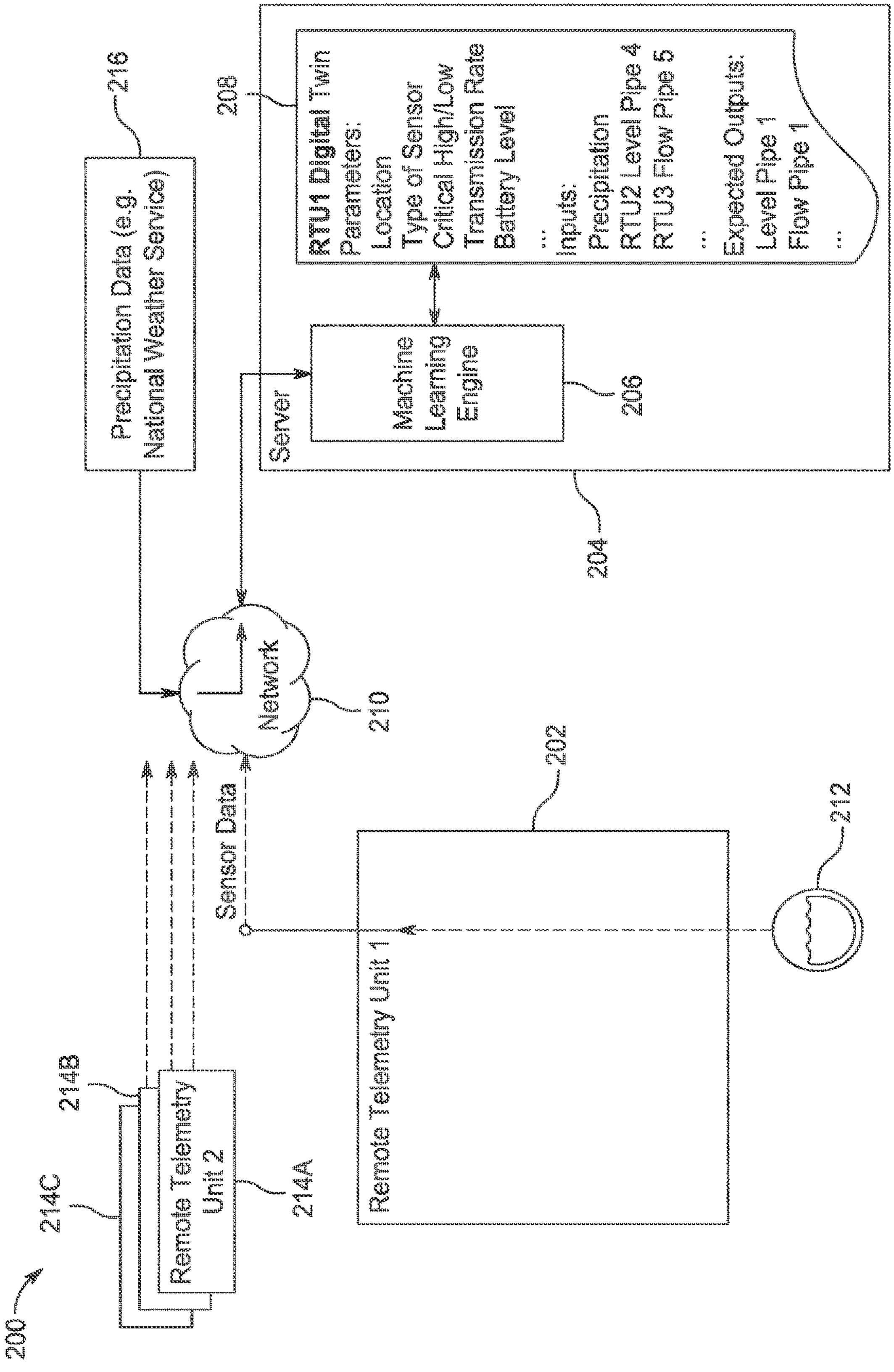
FIG. 2 shows the fluid infrastructure network management system of FIG. 1 including a server that is communicatively coupled to multiple remote telemetry units and to simplify illustration shows a configuration of the server that has stored therein a digital twin model, which estimates a flow attribute, as a function of time, inside a fluid infrastructure item that is being monitored by the remote telemetry unit.

Although FIG. 1 shows that server 104 is communicatively coupled, through network 110, to a single RTU 102, the present arrangements are not so limited. To this end, FIG. 2 shows a fluid infrastructure network management system 200, according to another embodiment of the present arrangements and that includes a server 204 communicatively coupled, through a network 210, to multiple RTUs, e.g., an RTU 202 and other RTUs 214A, 214B and 214C. In this embodiment, RTU 202, network 210 and server 204, are substantially similar to their counterparts, i.e., RTU 102, network 110 and server 104, respectively, shown in FIG. 1.

FIG. 2 shows that server 204 of fluid infrastructure network management system 200 has operating therein a machine learning engine 206 and a RTU digital twin model 208. One or more sensor measurements taken from sensor 212 are conveyed from RTU 202, through network 210, to server 204. A sensor measurement is not the only information that is so conveyed. Sensor parameter information related to sensor 212 of FIG. 2, which is substantially similar to sensor 112 of FIG. 1, is conveyed from RTU 202, through network 210 (e.g., the Internet or a satellite), to server 204. Similarly, other sensor measurements, taken using one or more different sensors (i.e., different from sensor 212) are conveyed from one or more RTUs (e.g., RTU 214A, RTU 214B and RTU 214C, if the fluid infrastructure items associated with each of these RTUs provide an input or input stream into the RTU 202) associated with one or more of these different sensors, through network 210, to server 204.

In one embodiment of the present arrangements, inside server 204, machine learning engine 206 uses sensor parameter information of the fluid infrastructure network, sensor measurements of inputs into and outputs from the fluid infrastructure item of interest, i.e., fluid infrastructure item for which the digital twin model is being constructed, and a probability distribution function of environmental information surrounding the sensor (e.g., sensor 212 of FIG. 2) to construct a digital twin model of RTU 202. A digital twin model, according to preferred embodiments of the present teachings, is a stochastic predictive model that forecasts the measurements of one or more of the sensors in the fluid infrastructure network.

Representative sensor measurements, in connection with a fluid inside a fluid infrastructure item, include flowrate data, flow level data, hydrostatic pressure data, flow velocity data, concentration data for one or more chemical species of interest, pH, turbidity, total suspended solids, residual chlorine, total chlorine, total organic carbon, dissolved oxygen, ammonia, nitrates, and phosphorous. Sensor measurements taken using a sensor are conveyed using an associated RTU therewith (e.g., RTU 214A, RTU 214B and RTU 214C if the fluid infrastructure items associated with each of these RTUs provide an input or input stream into, or an output or an output stream exiting RTU 202), through network 210, to server 204.

In connection with inputs into a fluid infrastructure item of interest (e.g., infrastructure item which has flow attributes measured by sensor 212), the input information used to construct digital twin model 208 includes at least one information chosen from a group comprising precipitation information surrounding the sensor (e.g., sensor 212 measurements of which are estimated by digital twin model 208), fluid level of one or more different inputs into a fluid infrastructure item and flow rate of one or more different the inputs into a fluid infrastructure item. By way of example, if RTU 214A is associated with a conduit, which serves as a fluid infrastructure item and conveys fluid from a storage tank, another fluid infrastructure item monitored by RTU 214B, to RTU 202, then a fluid flowrate sensor measurement of the conduit is conveyed from RTU 214A, through network 210, to server 204 and/or a fluid level sensor measurement of the storage tank is conveyed from RTU 214B, through network 210, to server 204. Further, these sensor measurements of the inputs into RTU 202 are conveyed through a network to a server for construction of digital twin model 208, one of which also ultimately resides in RTU 202.

As another example, server 204 receives precipitation data 216 from National Weather Service that forecasts the amount and time of precipitation at an area surrounding the location of a remote sensor (e.g., sensor 212) for the construction, using machine learning engine 206, of a digital twin model (e.g., digital twin model 208) of an RTU (e.g., RTU 202). In this manner, digital twin models of each RTU (e.g., RTU 202, RTUs 214A, 214B, or 214C) are constructed and preferably stored inside a server (e.g., server processor 140 of FIG. 1).

Similarly, with respect to outputs exiting fluid infrastructure item of interest (e.g., infrastructure item which has flow attributes measured by sensor 212), the output information used to construct digital twin model 208 includes at least one information chosen from a group comprising evaporation information surrounding the sensor (e.g., sensor 212 measurements of which are estimated by digital twin model 208), fluid level of one or more different outputs exiting a fluid infrastructure item and flow rate of one or more different outputs exiting a fluid infrastructure item. Fluid flowrate and/or fluid level measurements of outputs or output streams exiting fluid infrastructure item of interest (being monitored by RTU 202) are conveyed from their respective RTUs, through network, to the server. Such sensor measurements of the outputs exiting RTU 202 are used in the construction of digital twin model 208.

Examples of sensor parameters include location of the sensor, (e.g., sensor 212), type of sensor, critical high/low transmission rates of sensor and/or of RTU (e.g., RTU 202, RTUs 214A, 214B, or 214C), battery level of sensor. Some or all these parameters are obtained from a sensor, an RTU or are input at a server.

In one embodiment of the present teachings, the digital twin model (e.g., digital twin model 208 of FIG. 2) is initially created using a microprocessor (e.g., microprocessor 128 of FIG. 1) at an RTU (e.g., RTU 102 of FIG. 1) using the information discussed above and then a copy of that digital twin model is conveyed to the server (e.g., server 204 of FIG. 2.) However, a server may enjoy superior data processing capabilities over an RTU, and therefore in preferred embodiments of the present teachings, digital twin model 208 is initially constructed inside server 204 and is then a copy of the digital twin model is conveyed through network 210 to RTU 202 so that a copy of digital twin model 208 resides at server 204 and at RTU 202.

Figure 3:
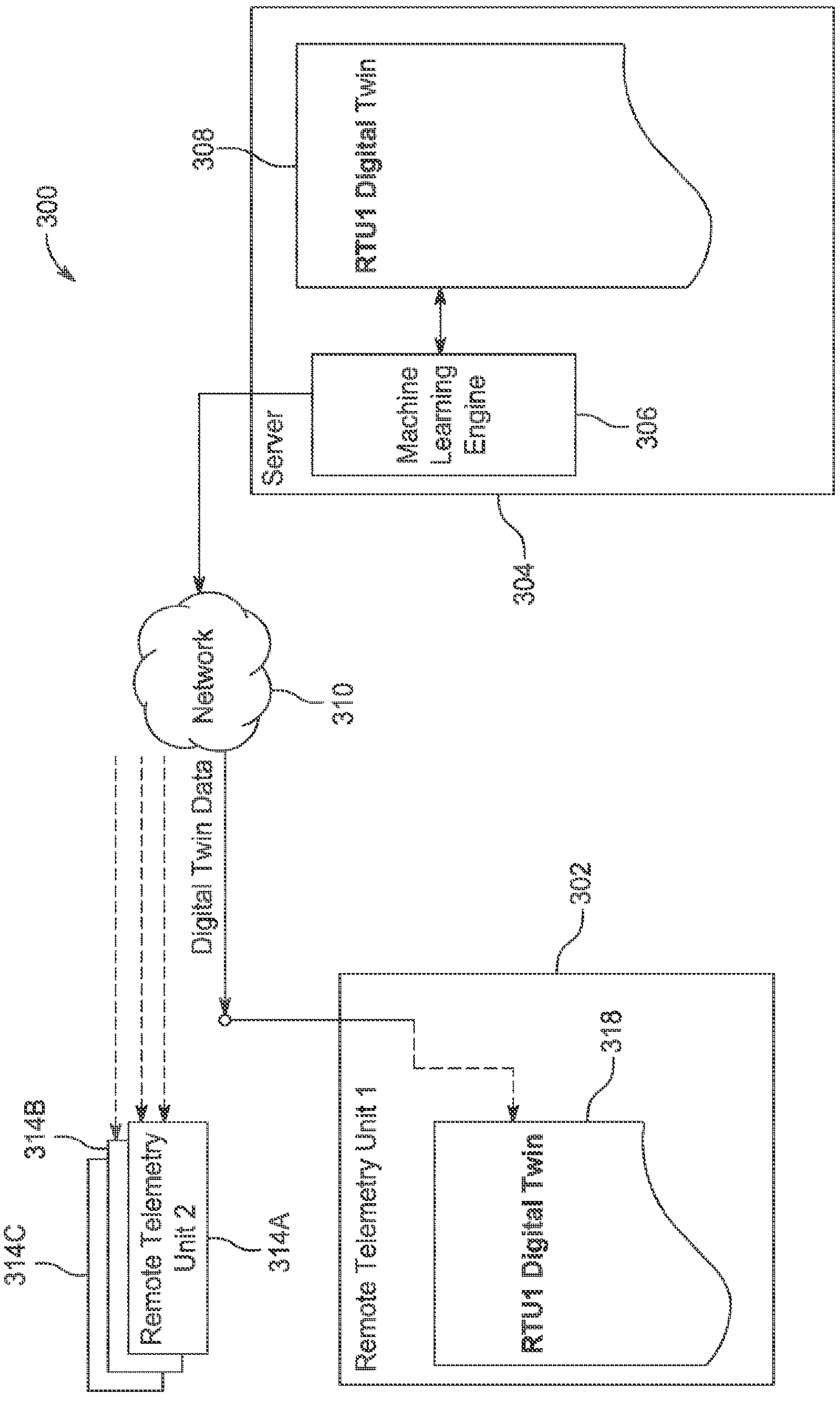
FIG. 3 shows another fluid infrastructure network management system, according to another embodiment of the present arrangements, including one copy of a digital twin model stored on the server and another copy of the digital twin model stored on the remote telemetry unit.

In this context, FIG. 3 shows a fluid infrastructure network management system 300, according to preferred embodiments of the present arrangements and teachings, in which an RTU 302 communicatively coupled, through network 310, to a server 304, which is also communicatively coupled to multiple RTUs, i.e., RTU 314A, RTU 314B and RTU 314C. Further, server 304 has residing therein a machine learning engine 306 and digital twin model 308 that is used for predicting or forecasting the measurements of a sensor (e.g., sensor 212 of FIG. 2) that is monitored by RTU 302. In this configuration, RTU 302, network 310, server 304, RTU 314A, RTU 314B and RTU 314C, machine learning engine 306 and digital twin model 308 are substantially counterparts, i.e., RTU 202, network 210, server 204, RTU 214A, RTU 214B and RTU 214C, machine learning engine 206 and digital twin model 208, shown in FIG. 2. Further, in this configuration, a copy of the digital twin model is, preferably, conveyed from server 304, through network 310, to RTU 302. As a result, there are two copies of a digital twin model, one at server 304 and that is denoted by reference numeral "308," and another at RTU 302 and that denoted by reference numeral "318."

The present teachings recognize that in this manner, digital twin models for other infrastructure items, in the fluid infrastructure network, that are monitored by other RTUs, e.g., RTU 314A, RTU 314B and RTU 314C, are created either, preferably, in server 304 or in RTU 302 and then a copy of the digital twin model is conveyed to the other, i.e., either, preferably, to RTU 302 or server 304. Regardless of the approach of where an initial digital twin model is created, a server, e.g., server 304, has stored thereon a copy of a digital twin model of a digital twin model stored inside each of the RTUs that monitor different fluid infrastructure items in a fluid infrastructure network. More importantly, the present teachings recognize that a server, preferably, incorporates an infrastructure connection between RTUs (e.g., RTU 314B monitors a tank, which is located downstream from RTU 314A that monitors a conduit that is connected to a fluid infrastructure item that is monitored by RTU 302), to automatically determine—"a system wide digital twin model." To this end, the present teachings recognize also that such a "system wide digital twin model" may allow a few scheduled transmissions of actual sensor measurements from one or more RTUs to the server and gain a more precise estimate of the sensor measurements being monitored by one or more of the RTUs, without dramatically increasing the energy requirements associated with transmissions of sensor measurements from the RTU to the server. It is not necessary to create a "system wide digital twin model," and the present teachings recognize that by simply constructing, in the server, different digital twin models, a copy of each also being stored on the RTU, the present arrangements offer the advantages of RTUs, without relying on the monitoring activities of the RTUs.

Figure 4:
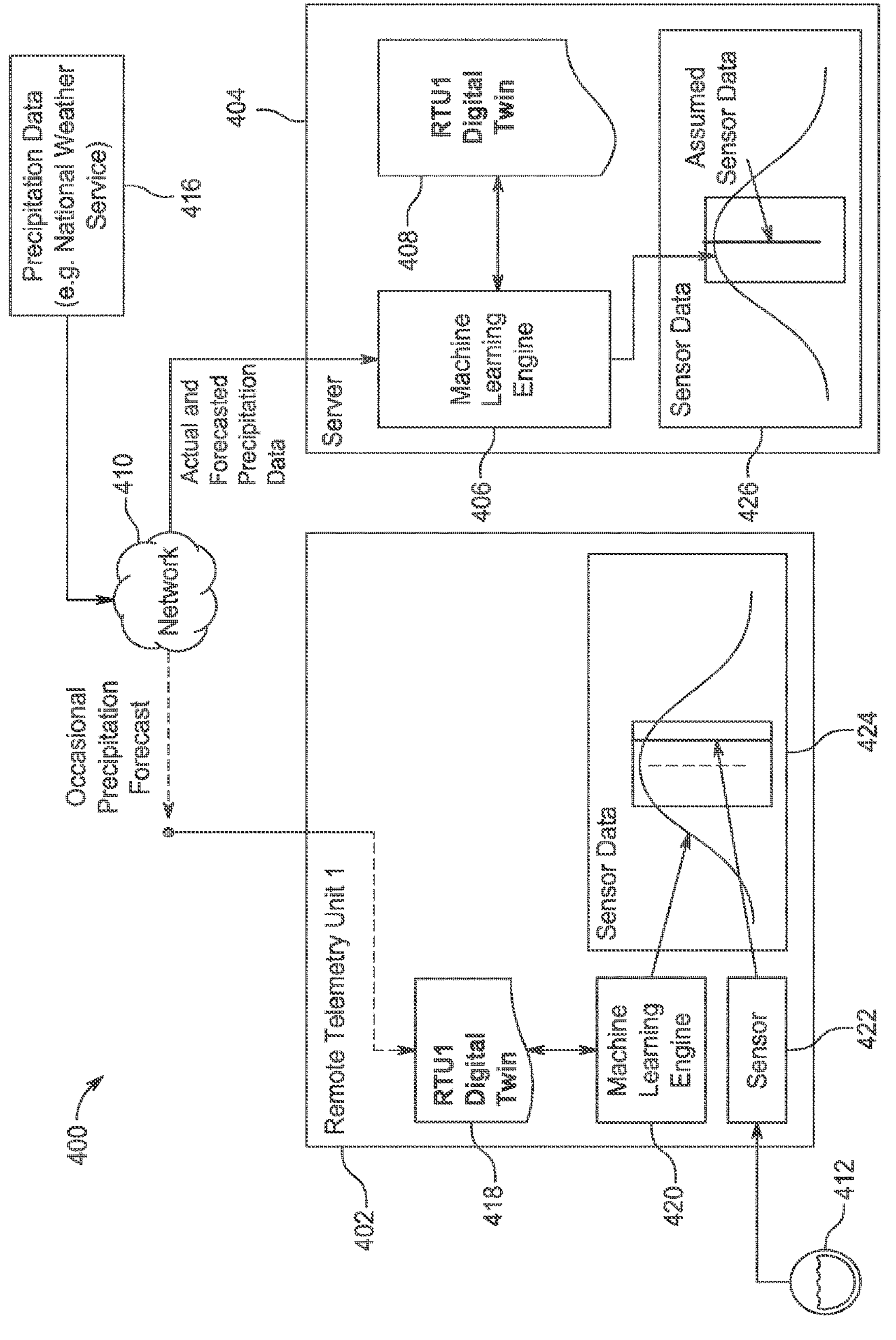
FIG. 4 shows yet another fluid infrastructure network management system, according to yet another embodiment of the present arrangements and that uses a server's digital twin model to generate one or more estimated flow attribute values of the remotely located fluid infrastructure item and facilitate management of that item.

FIG. 4 shows a fluid infrastructure network management system 400, according to a preferred embodiment of the present arrangements. As explained below, management system 400 relies on an estimation of flow attribute inside a fluid infrastructure item by a server as being or being an estimate of the sensor measurement of a flow attribute inside a fluid infrastructure item. In this embodiment of the present teachings, management system 400, preferably, does not receive a sensor measurement from an RTU that is monitoring and periodically receiving the sensor measurements of a flow attribute inside the fluid infrastructure item.

In the embodiment shown in FIG. 4, an RTU 402, preferably, occasionally receives, through network 410, a forecast of precipitation data 416 (e.g., time and amount of precipitation, which may be in the form a probability distribution function). Using the forecast of precipitation data, an RTU digital twin model 418 instructs, preferably, a machine learning engine 420 (located at the RTU) to generate a probability distribution function estimating a flow attribute that may be measured, at a future instance in time or at a future period in time, by a sensor. As another input, RTU 402 also receives, at a sensor module 422, a sensor measurement from a sensor 412, measuring a flow attribute inside a fluid infrastructure item. RTU 402, therefore, is in good position to compare the sensor measurement with one or more of the RTU's estimated flow attributed values. In preferred embodiments of the present teachings, RTU 402 electronically compares, a graphical representation of which comparison is denoted by reference numeral "424," the sensor measurement with a probability distribution function of the estimated flow attribute values.

If the sensor measurement falls within a confidence interval of one or more RTU's estimated flow attribute values (e.g., that ranges in value from about ±10% of the mean of the probability distribution function to about ±15% of the mean of the probability distribution function), then the present teachings recognize that, as an energy savings measure, an RTU need not convey the actual sensor measurement to the server.

Server 404 also receives, through network 410, a forecast of precipitation data 416 (e.g., time and amount of precipitation which may be in the form a probability distribution function). Server 404 uses a server's digital twin model 408 to use precipitation data 416 and generate a probability distribution function, estimating flow attribute values for an infrastructure item. In preferred embodiments of the present arrangements, digital twin model 408 instructs a machine learning engine 406 to use precipitation data 416 and generate the probability distribution function that estimates flow attribute values. Regardless of the way in which the flow attribute sensor measurement is estimated, server 404 assumes the sensor measurement to be a mean value of the probability distribution function estimating flow attribute values and reports, at a server's user interface, the mean value of the server's probability distribution function as being the sensor measurement or being an estimate of the sensor measurement.

Such reporting may be periodic, e.g., every 5 minutes, and need not be carried out after the lapse of future instance in time, which forms the basis of the estimate, e.g., the probability distribution function, of the sensor measurement. In one preferred embodiment of the present teachings, after a lapse of future instance in time or after a lapse of future period in time and if server 404 does not receive from RTU 402 a sensor measurement, then server reports to a user the mean value of the server's probability distribution function as being the sensor measurement or being a reliable estimate of the sensor measurement.

Further, even if the actual sensor measurement falls within a confidence interval, RTU 402 may convey, through network 410, the actual sensor measurement to server 404. Under such conditions and for conserving energy, RTU 402 may so convey relatively infrequently, e.g., once a day or once a week, the actual sensor measurements. In certain embodiments of the present teachings, when server 408 does not receive, at predefined time, a sensor measurement from RTU 402, then at or after the predefined time, server 408 relies upon precipitation data to calculate server's estimated flow attribute values e.g., a probability distribution function, and reports a mean value of these estimated flow attribute values as being the sensor measurement or being a reliable estimate of the sensor measurement.

The present teachings also recognize the importance of a possibility that the sensor measurement falls outside the confidence interval of the RTU's one or more estimated flow attribute values (e.g., outside of the ranges in value from about ±10% of the mean of the probability distribution function to about ±15% of the mean of the probability distribution function), then the present teachings recognize that an additional condition must be tested, i.e., whether the actual amount of precipitation realized is an outlier or within the expected amount of precipitation (as discerned from precipitation data 416).

Figure 5:
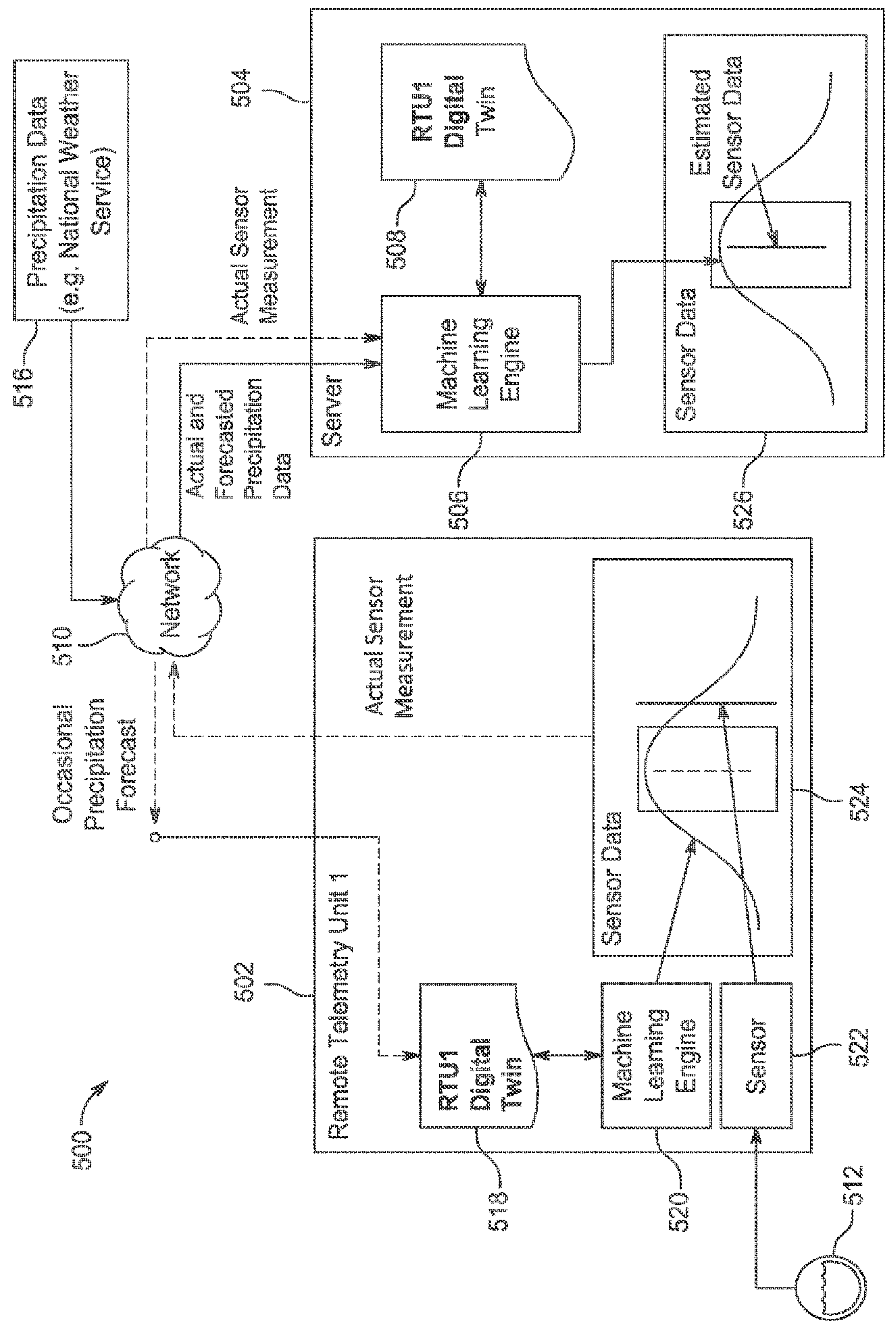
FIG. 5 shows yet another fluid infrastructure network management system, according to yet another embodiment of the present arrangements and that uses the digital twin models, one copy at the server and another copy at the remote telemetry unit, to determine whether a forecast of environmental conditions used by the digital twin models in generating estimated flow attribute values was an outlier and should be maintained, or whether the digital twin models no longer provide a reliable estimate and should be updated, recalibrated or reconstructed.

In the embodiment shown in FIG. 5, a fluid network management system 500 includes an RTU 502 that is communicatively coupled, through a network 510, to a server 504. Further, RTU 502, server 504, server machine learning engine 506, server digital twin model 508, network 510, sensor 512, RTU digital twin 518, RTU machine learning 520, sensor module 522, a graphical representation 524 of sensor data relative to RTU's estimated sensor data and a graphical representation 526 of sensor data relative to the server's estimated sensor data are substantially similar to their counterpart shown in FIG. 4, i.e., RTU 402, server 404, server machine learning engine 406, server digital twin model 408, network 410, sensor 412, RTU digital twin 418, RTU machine learning 420, sensor module 422 and a graphical representation 424 of sensor data relative to RTU's estimated sensor data and a graphical representation 426 of sensor data relative to the server's estimated sensor data.

Precipitation data 516, e.g., the actual amount of precipitation realized in areas surrounding one or more sensors such as sensor 512, is conveyed, preferably through network 510, to both RTU 502 and server 504. In this configuration, RTU 502, using machine learning engine 520 and forecasts of environmental conditions obtained from precipitation data 516, determines RTU's new estimated flow attribute values inside a fluid infrastructure item for an instance in time or for a period of time.

If the absolute value of a difference between the sensor measurement obtained from sensor 512 and sensor module 522 and the RTU 502's new estimated flow attribute values is greater than a predefined threshold tolerance value, or if the sensor measurement, for the instance in time or for the period of time, falls outside the predefined confidence interval of the RTU 502's multiple estimated flow attribute values, then the underlying sensor measurement used for computing the estimate is conveyed from RTU 502, through network 510, to server 504. At server 502, precipitation data 516, e.g., the actual amount of precipitation realized around areas surrounding one or more sensors, such as sensor 512, is used to compute one or more server 504's new estimated flow attribute values (e.g., see curve in graphical representation 526). This estimate is of a flow attribute, for an instance in time or for a period of time, inside a fluid infrastructure item being monitored by sensor 512. Server 504 compares, as shown in graphical representation 526, the sensor measurement taken from sensor 512 with one or more server 504's new estimated flow attribute values (e.g., a probability distribution function that includes multiple estimated values).

If the absolute value of a difference between the sensor measurement and one of the server's new estimated flow attribute values is equal to or greater than a check predefined threshold tolerance value, or if the sensor measurement, for an instance in time or for a period of time, falls outside the check predefined confidence interval of multiple server's new estimated flow attribute values, then the digital twin model 508 is maintained at server 504. In this scenario, the present teachings recognize that the actual precipitation realized in the area surrounding sensor 512 is an outlier relative to the forecasted amount of precipitation in that area. As a result, the present teachings do not deem digital twin model to be an inaccurate at estimating the flow attribute inside a remotely located fluid infrastructure item, rather understand that the forecast did not accurately predict the amount of precipitation.

If, however, the absolute value of the difference between the sensor measurement and one of the server's new estimated flow attribute values is equal to or less than the check predefined threshold tolerance value, or if the sensor measurement, for an instance in time or for a period of time, falls within the check predefined confidence interval of multiple server's new estimated flow attribute values, then digital twin model 508 is updated, recalibrated or reconstructed at server 504. A copy of this updated, recalibrated or reconstructed digital model is conveyed to RTU 502 so that the "twin" nature of the digital model is reestablished. The digit twin model is updated, recalibrated or reconstructed because the present teachings recognize that the previous digital twin models' estimated flow attribute values are unreliable, or otherwise unacceptable. As a result, the present teachings propose updating, recalibrating, or reconstructing, as may be needed, so that the new digital twin models' estimated flow attribute values are reliable and acceptable.

The present teachings also offer novel methods of infrastructure management. Although implementation of these novel methods do not require a specific system configuration, but novel methods implemented using the structural details described in FIGS. 1-5 represent preferred embodiments of the present arrangements.

Figure 6:
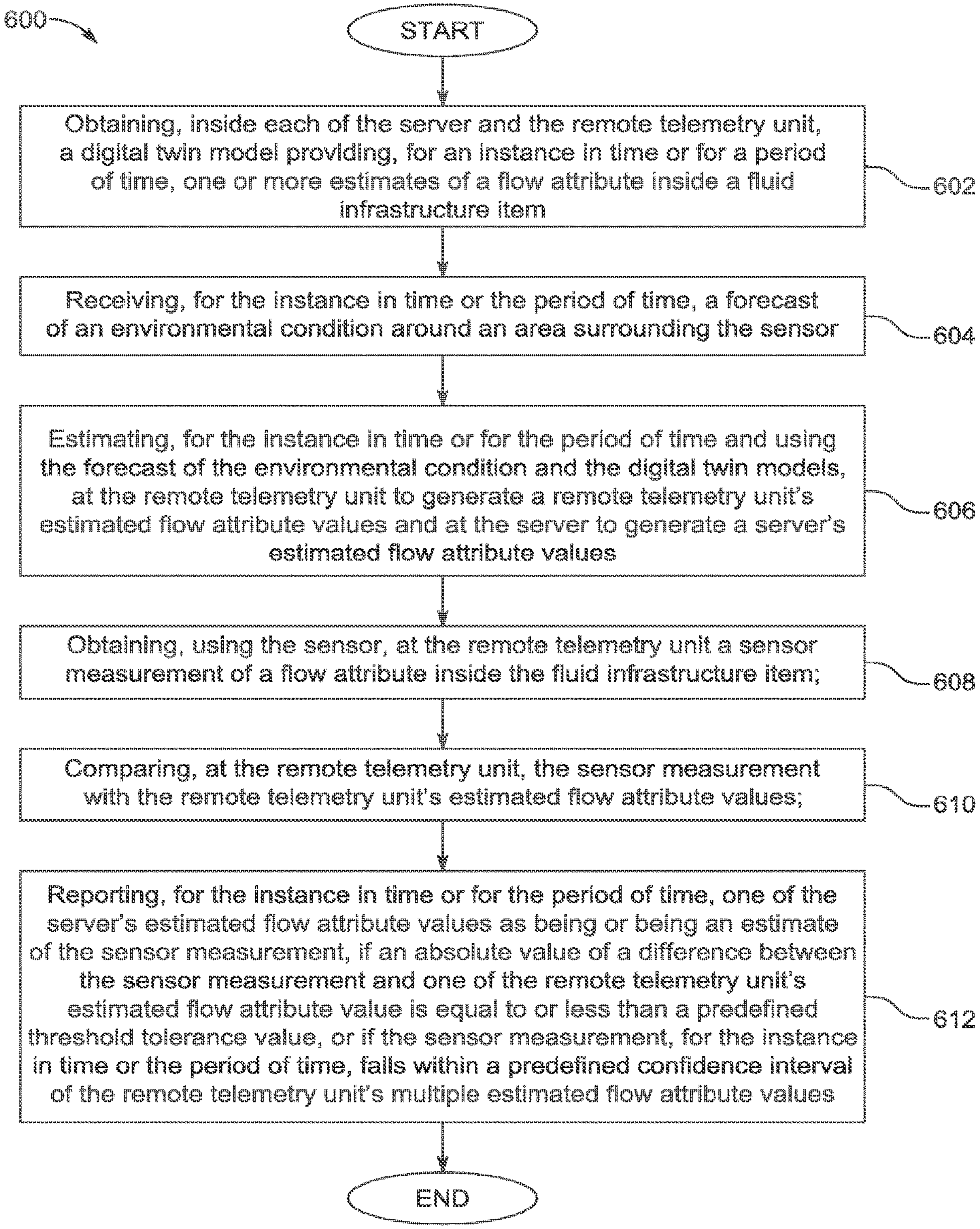
FIG. 6 is a flowchart describing an infrastructure management method, according to one embodiment of the present teachings and that does not require expending energy and conveying to a server a sensor measurement of a flow attribute of a remotely located fluid infrastructure item.

FIG. 6 shows an infrastructure management method 600, according to one embodiment of the present teachings. Infrastructure management method 600, preferably, begins with an element 602, which includes obtaining, inside each of a server (e.g., server 104 of FIG. 1) and inside an RTU (e.g., RTU 102 of FIG. 1), a digital twin model. As explained above, the digital twin models provide, for an instance in time or for a period of time, one or more estimates of a flow attribute inside a fluid infrastructure item. Next, method 600 advances to an element 604, which involves receiving, for the instance in time or for the period of time, a forecast of an environmental condition around an area surrounding a sensor (e.g., sensor 112 of FIG. 1). Then, an element 606 is carried out and uses, for the instance in time or for the period of time, a forecast of the environmental condition (obtained in element 604) and the digital twin models (obtained in element 602), at the RTU to generate a RTU's estimated flow attribute inside the fluid infrastructure item.

Element 606 may also include estimating, at the server, for the instance in time or for the period of time, using the forecast of environmental condition and the digital twin models, to generate one or more server's estimated flow attribute values for the fluid infrastructure item. In another embodiment, another element, which is different from element 606, in method 600 is implemented to arrive at one or more server's estimated flow attribute values for the fluid infrastructure item. As a result, generating these two estimates, i.e., the RTU's and the server's estimated flow attribute values of the fluid infrastructure item, may be thought of as two separate elements or as a single element of method 600.

Regardless of whether one or two elements are implemented to obtain these estimated flow attribute values, method 600 proceeds to an element of 608, which involves obtaining, using the sensor (e.g., sensor 112 of FIG. 1), at the RTU a sensor measurement of a flow attribute inside the fluid infrastructure item. Then, method 600 advances to an element 610 of comparing, at the RTU, the sensor measurement with the RTU's estimated flow attribute values. In element 610, at the RTU, the sensor measurement of the flow attribute inside the fluid infrastructure item is compared with one or more of RTU's estimated flow attribute values. By way of example, FIG. 4 shows a graphical representation 424 as an exemplar illustration of "comparing" carried out under element 610.

Preferably, after element 610 has concluded, an element of 612 is carried out. According to the embodiment shown in FIG. 6, element 612 of method 600 involves reporting, for the instance in time or for the period of time, the server's estimated flow attribute values being or being an estimate of the sensor measurement of a flow attribute inside the fluid infrastructure item, if an absolute value of a difference between the sensor measurement and the RTU's estimated flow attribute values is equal to or less than a predefined threshold tolerance value, or if, for the instance in time or for the period of time, the sensor measurement falls within a predefined confidence interval of the RTU's multiple estimated flow attribute values. By way of example, FIG. 4 shows a graphical representation 426 as an exemplar illustration of "reporting" carried out under element 612.

In another preferred embodiment of the present teachings, element 612 involves, after a lapse of the instance in time or a lapse of the period of time, reporting the server's estimated flow attribute being provided in place of the sensor measurement of the fluid infrastructure item, if a sensor measurement of a flow attribute inside the fluid infrastructure item is not received at the server. In one implementation of this embodiment, the RTU does not convey the sensor measurement of the fluid infrastructure item to the server, if the RTU determines that the absolute value of the difference between the sensor measurement and the RTU's estimated flow attribute values is equal to or less than a predefined threshold tolerance value, or determines that the sensor measurement, for the instance in time or for the period of time, falls within a predefined confidence interval of the RTU's multiple estimated flow attribute values of the fluid infrastructure item.

Prior to the implementation of elements 610 and/or 612, method 600, more preferably, does not include conveying the sensor measurement of the flow attribute inside the fluid infrastructure item, from the RTU to the server.

Figure 7:
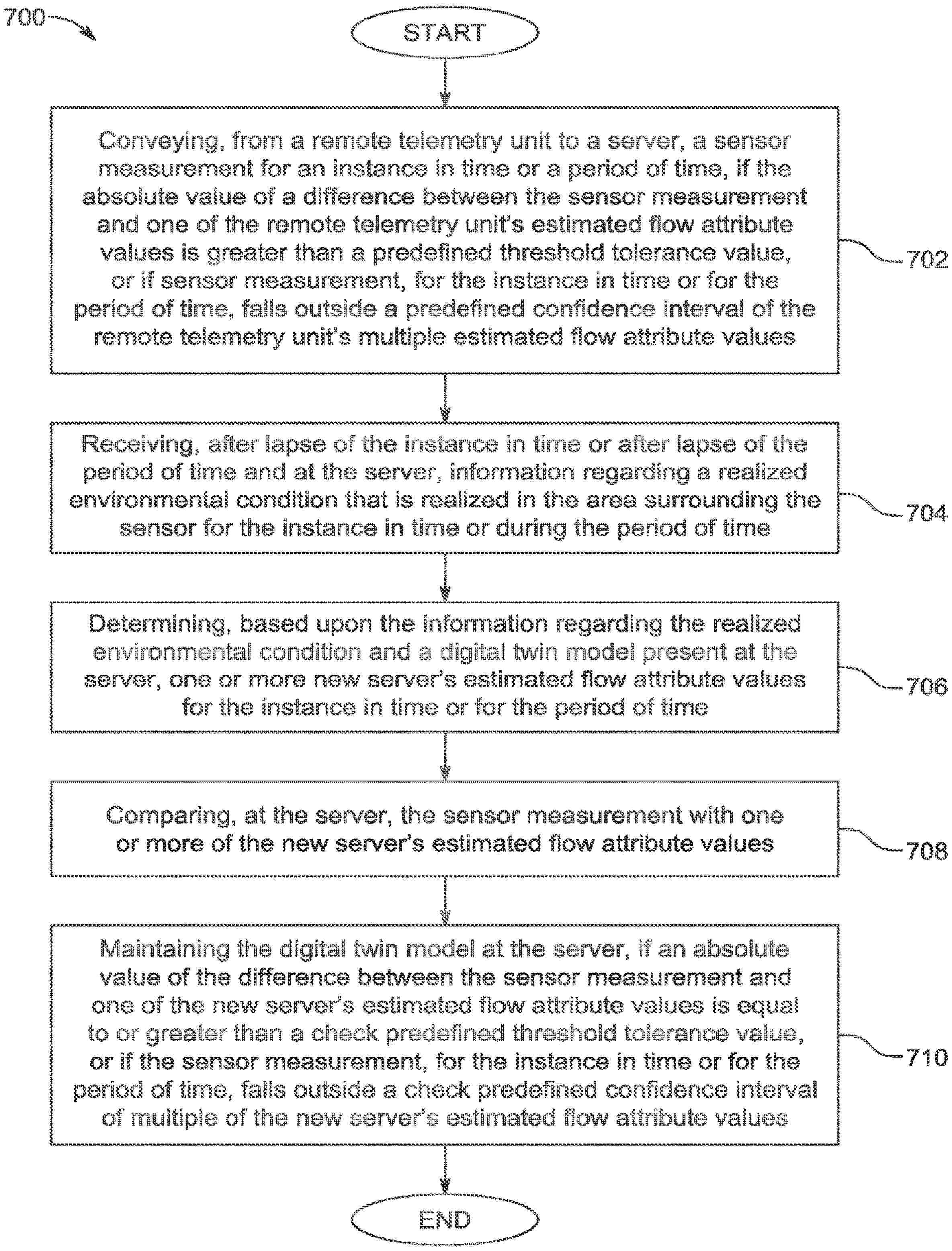
FIG. 7 is a flowchart describing another infrastructure management method, according to another embodiment and that establishes whether the digital twin models are reliably estimating attribute flow values inside the remotely located fluid infrastructure item and should be maintained at the server and the remote telemetry unit.

FIG. 7 shows a fluid infrastructure network management method 700, according to another embodiment of the present teachings. Management method 700, preferably, includes carrying out elements 602, 604, 606, 608, 610 and 612 as described above in connection with FIG. 6. Instead of carrying out element 612, FIG. 7 offers element 702, as it provides for a situation, in which the RTU conveys a sensor measurement, of a flow attribute inside the fluid infrastructure item, to a server.

Accordingly, element 702 involves conveying, from the RTU to the server, the sensor measurement for the instance in time or for the period of time, if the absolute value of the difference between the sensor measurement and one of the RTU's estimated flow attribute values is greater than the predefined threshold tolerance value, or if the sensor measurement, for the instance in time or for the period of time, falls outside the predefined confidence interval of the RTU's multiple estimated flow attribute values. By way of example, FIG. 5 shows a graphical representation 524 as an exemplar illustration of the underlying computation before "conveying," as described in element 702.

Method 700 includes an element 704 of receiving at the server, after lapse of the instance in time or the period of time, information regarding a realized environmental condition, i.e., realized around an area surrounding the fluid infrastructure item and the sensor for the instance in time or during the period of time. However, in one embodiment of method 700, element 704 of the present teachings may be carried out prior to the lapse of instance in time or prior to the period of time.

Next, method 700 involves carrying out an element 706 that involves determining, based upon the information regarding the realized environmental condition (obtained from element 704) and the digital twin model present at the server, a server's new estimated flow attribute values inside the fluid infrastructure item for the instance in time or for the period of time.

Then, method 700 includes an element 708 of comparing, at the server, the sensor measurement (obtained from element 702) with one of the server's new estimated flow attribute values (obtained from element 706).

Method 700 then advances to an element 710, which involves maintaining the digital twin model at the server, if an absolute value of the difference between the sensor measurement and one of the server's new estimated flow attribute values is equal to or greater than a check predefined threshold tolerance value, or if the sensor measurement, for the instance in time or for the period of time, falls outside a check predefined confidence interval of multiple of the server's new estimated flow attribute values. By way of example, FIG. 5 shows a graphical representation 526 to illustrate the underlying computation performed before "maintaining," as described under maintaining.

The above-mentioned elements in connection with methods 600 and 700 may be implemented in a wide variety of different embodiments. By way of example, element 602 includes building, inside the server or the RTU, the digital twin model providing, for the instance in time or for the period of time, one or more estimated flow attribute values of the fluid infrastructure item. In one preferred embodiment, element 602 of the present teachings comprises building a stochastic predictive model using sensor parameter information, a probability distribution function of environmental information in the area surrounding the sensor, input information and output information relating to the fluid infrastructure item. To this end, FIG. 2 shows an exemplar digital twin model 208 formed at server 204.

The sensor parameter information includes at least one item chosen from a group comprising location of sensor, type of sensor, critical high flow attribute that is detectable by the sensor, critical low flow attribute that is detectable by the sensor, transmission rate of sensor data and battery level of the sensor.

The input information includes at least one information chosen from a group comprising precipitation information in an area surrounding the sensor associated with the RTU, fluid level of one or more different inputs into the fluid infrastructure item and flow rate of one or more different inputs into the fluid infrastructure item.

The output information includes at least one information chosen from a group comprising evaporation information around the sensor associated with the RTU, fluid level of one or more different outputs exiting the fluid infrastructure item and flow rate of one or more different outputs exiting the fluid infrastructure item.

In addition to fluid level and/or fluid flowrate, flow attribute of input information and output information may also include at least one attribute chosen from a group comprising hydraulic head, groundwater flux, rate of groundwater flux, pH, conductivity, concentration of total organic compounds, amount of total suspended solids and turbidity.

Building, as contemplated under element 602, preferably, includes generating, using a machine learning module, a probability distribution function of the estimated sensor measurements of the flow attribute inside the fluid infrastructure item.

Regardless of the manner in which the digital twin model is obtained, element 602 may include modifying, using the RTU and the sensor (e.g., sensor measurements provide insight into the reliability of the digital twin model's estimate) the digital twin model until it reliably estimates the flow attribute inside the fluid infrastructure item. By way of example, modifying of the digital twin model includes revising values of one or more parameters, associated with the fluid infrastructure item that is used to build an initial version of the digital twin model, until one or more of the estimates of the flow attribute obtained from the digital twin model are equal or close to the sensor measurement (e.g., sensor measurements obtained from sensor 212 of FIG. 2).

In one preferred embodiment of the present teachings, modifying of the digital twin model includes determining that a Nash-Sutcliff coefficient of the digital twin model is greater than a predefined acceptable value, or determining that a root mean squared deviation, between the estimates of the flow attribute and sensor measurements of the flow attribute obtained for different instances in time or for different periods of time, is less than or equal to a predefined error value.

The present teachings recognize that building and modifying, if these elements are implemented, preferably, provides at least one of the digital twin models (e.g., digital twin model 208 of FIG. 2) inside the server (e.g., server 204 of FIG. 2). Further, the server (e.g., server 204 of FIG. 2) has installed therein or is communicatively coupled to a machine learning engine (e.g., machine learning engine 206 of FIG. 2) that builds the digital twin model and confirms that the digital twin model is an acceptable model for reliably estimating flow attributes inside a fluid infrastructure item.

According to certain preferred embodiments of the present teachings, once an acceptable digital twin model is present at the server, method 600 includes an element of conveying or transmitting a copy of the digital twin model from the server to the remote telemetry unit (e.g., server 304 conveys a copy of digital twin model 308, through network 310, to RTU 302 such that the copy is stored as digital twin model 318 therein as shown in FIG. 3).

After an acceptable digital twin model is obtained at the server, method 600 of FIG. 6, preferably, further comprises storing the digital twin model on a memory (e.g., database 142) associated with the server (e.g., server 104 of FIG. 1), and on a remote memory (e.g., RTU's memory 130 of FIG. 1) that is remotely located relative to the memory (e.g., database 142) or the server (e.g., server 104 of FIG. 1).

In one aspect of element 604 shown in FIG. 6, method 600 includes receiving a probability distribution function, for the instance in time or for the period of time, forecasting an amount of precipitation to be realized around an area surrounding the sensor. The probability distribution function, preferably, provides multiple estimated values for the amount of precipitation to be realized around the area surrounding the sensor.

According to preferred implementations of the present teachings, when implementing element 606 of method 600 shown in FIG. 6, a neural network computes the server's estimated flow attribute values for the instance in time or for the period of time. Further, a machine learning engine, disposed inside the RTU, computes the RTU's estimated flow attribute values for the instance in time or for the period of time. Further still, each of the server's estimated flow attribute values and the RTU's estimated flow attribute values, preferably, is a probability distribution function. By way of example, in FIG. 4, each of graphical representation 426 at server 404 and graphical representation 424 at RTU 402 show a probability distribution function estimating flow attribute values inside the fluid infrastructure item.

Continuing with this example and in connection with element 608 shown in FIG. 6, method 600, preferably, includes comparing, at the RTU, the sensor measurement of the flow attribute with the RTU's probability distribution function, estimating flow attribute values inside the fluid infrastructure item, for the instance in time or for the period of time.

Element 612, preferably, includes reporting, for the instance in time or for the period of time, a mean value of the server's probability distribution function as being the sensor measurement or being an estimate of the flow attribute inside the fluid infrastructure item, if the sensor measurement for the instance in time or for the period of time, falls within a predefined confidence interval of a mean value of the RTU's probability distribution function. In one embodiment, the present teachings recognize that the confidence interval spans a predefined range of estimated flow attribute values, which deviates from a mean value of the RTU's probability distribution function.

In one preferred implementation of method 600, element 604 includes receiving, at a periodic rate, the forecast of the environmental condition around an area surrounding the sensor. In one implementation of this embodiment, element 606 of the present teachings includes estimating, at the periodic rate or less than the periodic rate, and at the RTU flow attribute inside the fluid infrastructure item to generate one or more RTU's estimated flow attribute values. Continuing with this embodiment, element 608 of the present teachings includes obtaining, at a sampling rate of the sensor, the sensor measurement. In this embodiment, the sampling rate is greater than the periodic rate.

Further, if the absolute value of the difference between the sensor measurement and one of the RTU's estimated flow attribute values is greater than the predefined threshold tolerance value, or if the sensor measurement, for the instance in time or for the period of time, falls outside the predefined confidence interval of the RTU's multiple estimated flow attribute values, then the management method of the present teachings, preferably, further includes an element of conveying (e.g., element 702), at least at or less than the sampling rate, from the RTU to the server, the sensor measurement taken for the instance in time or for the period of time.

This preferred embodiment further includes an element of receiving (e.g., substantially similar to element 704 of FIG. 7), after lapse of the instance in time or after lapse of the period of time and at the server, information regarding a realized environmental condition (e.g., amount of precipitation) realized in the area surrounding the sensor for the instance in time or for during the period of time. Next, like element 706 of FIG. 7, based upon the information regarding the realized environmental condition and the digital twin model present at the server, management methods of the present teachings provide an element of determining a server's new estimated flow attribute values for the instance in time or for the period of time. In one embodiment of the element of determining, the server's new estimated flow attribute values is a probability distribution function (e.g., the probability distribution functions shown in graphical representation 526 of FIG. 5).

Then, at the server, management methods of the present teachings implement an element of comparing (e.g., substantially similar to element 708 of FIG. 7), which involves comparing the sensor measurement with the server's new estimated flow attribute values. Management method of the present teachings then advance to maintaining the digital twin model at the server, if an absolute value of the difference between the sensor measurement and one of the server's new estimated flow attribute values is equal to or greater than a check predefined threshold tolerance value, or if the sensor measurement, for the instance in time or for the period of time, falls outside a check predefined confidence interval of multiple of the server's new estimated flow attribute values. If the digital twin model is maintained at the server, then management methods of the present teachings include maintaining the copy of digital twin model at the RTU.

In preferred embodiments, management methods of the present teachings include obtaining, inside each of the server and inside the RTU, a new digital twin model different from the (original) digital twin model, if the absolute value of the difference between the sensor measurement and one of the server's new estimated flow attribute values is less than a check predefined threshold tolerance value, or if the sensor measurement, for the instance in time or for the period of time, falls inside the check predefined confidence interval of multiple of the server's new estimated flow attribute values.

In connection with method 700, the present teachings offer additional different embodiments for effective management of a fluid network. In one such embodiment, method 700 includes obtaining, inside the RTU, a new digital twin model, if the absolute value of the difference between the sensor measurement and one of the remote telemetry unit's new estimated flow attribute values is less than a check predefined threshold tolerance value, or if the sensor measurement, for the instance in time or for the period of time, falls inside the check predefined confidence interval of multiple of the remote telemetry unit's new estimated flow attribute values.

Continuing with this embodiment, method 700, preferably, further includes an element of conveying the new digital twin model, formed at the RTU, to the server. In this embodiment, the element of conveying is carried out using a communicative coupling between the RTU and the server. In this configuration, the server is communicatively coupled to multiple RTUs and has stored thereon one copy of the digital twin model that is also stored on one of the RTUs, Further, each RTU is coupled to a sensor that measures a particular type of flow attribute inside a fluid infrastructure item. The digital twin at the server allows the server to use, after lapse of the instance in time or the period of time, information regarding the amount of realized precipitation to arrive at the server's new estimates flow attribute values and operate, in certain instances, independently of the RTU, thereby conserving energy.

In the following description, numerous specific details are set forth in order to provide a thorough understanding of the present teachings and arrangements. It will be apparent, however, to one skilled in the art that the present teachings and arrangements may be practiced without limitation to some or all of these specific details. In other instances, well-known process steps have not been described in detail in order to not unnecessarily obscure the present teachings and arrangements.

What is claimed is:

1. A method of infrastructure management, said method comprising:

obtaining, inside each of a server and inside a remote telemetry unit, a digital twin model providing, for an instance in time or for a period of time, one or more estimates of a flow attribute inside a fluid infrastructure item, wherein said remote telemetry unit and a sensor are remotely located to said server, wherein said remote telemetry unit is communicatively coupled to a sensor that measures flow attribute inside said fluid infrastructure item such that said remote telemetry unit receives from said sensor a sensor measurement, and wherein said digital twin model inside said remote telemetry unit and said digital twin model inside said server are synchronized machine learning models;

receiving, for said instance in time or for said period of time and inside each of said remote telemetry unit and said server, a forecast of an environmental condition around an area surrounding said sensor;

estimating, at said remote telemetry unit and using said forecast of said environmental condition and one of said digital twin models, flow attribute inside said fluid infrastructure item for said instance in time or for said period of time to produce one or more remote telemetry unit's estimated flow attribute values;

estimating, at said server and using said forecast of said environmental condition and one of said digital twin models, flow attribute inside said fluid infrastructure item for said instance in time or for said period of time to produce one or more server's estimated flow attribute values;

obtaining, using said sensor and at said remote telemetry unit, said sensor measurement of said flow attribute inside said fluid infrastructure item;

comparing, at said remote telemetry unit, said sensor measurement with one or more of said remote telemetry unit's estimated flow attribute values;

reporting, for said instance in time or for said period of time, one or more of said server's estimated flow attribute values as being or being an estimate of said sensor measurement, if an absolute value of a difference between said sensor measurement and one of said remote telemetry unit's estimated flow attribute values is equal to or less than a predefined threshold tolerance value, or if said sensor measurement, for said instance in time or for said period of time, falls within a predefined confidence interval of said remote telemetry unit's multiple estimated flow attribute values.

2. The method of infrastructure management of claim 1, wherein obtaining includes:

building, inside said server or said remote telemetry unit, said digital twin model providing, for said instance in time or for said period of time, one or more of said remote telemetry unit's estimated flow attribute values or one or more of said server's estimated flow attribute values;

modifying, using said remote telemetry unit or said sensor, said digital twin model until said digital twin model reliably estimates said flow attribute inside said fluid infrastructure item and implementing said digital twin model at said server or at said remote telemetry unit.

3. The method of infrastructure management of claim 2, wherein said building comprises building a stochastic predictive model using sensor parameter information, a probability distribution function of environmental information around said area surrounding said sensor, input information and output information relating to said fluid infrastructure item.

4. The method of infrastructure management of claim 3, wherein said sensor parameter information includes at least one item chosen from a group comprising location of said sensor, type of sensor, critical high flow attribute that is detectable by said sensor, critical low flow attribute that is detectable by said sensor, data transmission rate of sensor and battery level of said sensor;

wherein said input information includes at least one information chosen from a group comprising precipitation information around said area surrounding said sensor associated with said remote telemetry unit, fluid level of one or more different said inputs into said fluid infrastructure item and flow rate of one or more different said inputs into said fluid infrastructure item; and wherein said output information includes at least one information chosen from a group comprising evaporation information around said sensor associated with the remote telemetry unit, fluid level of one or more different said outputs exiting said fluid infrastructure item and flow rate of one or more different said outputs exiting said fluid infrastructure item.

5. The method of infrastructure management of claim 3, wherein said building includes generating, using a machine learning module, a probability distribution function of said sensor measurements of said flow attribute inside said fluid infrastructure item.

6. The method of infrastructure management of claim 3, wherein said modifying includes revising values of one or more parameters, associated with said fluid infrastructure item and used in said building said digital twin model, until one or more of said estimates of said flow attribute obtained from said digital twin model are proximate or equal to said sensor measurement.

7. The method of infrastructure management of claim 6, wherein said modifying includes determining that a Nash-Sutcliff coefficient of said digital twin model is greater than a predefined acceptable value, or determining that a root mean squared deviation, between said estimates of said flow attribute and said sensor measurements of said flow attribute, obtained for different instances in time or for different periods of time, is less than or equal to a predefined error value.

8. The method of infrastructure management of claim 3, further comprising developing one of said digital twin models in said server.

9. The method of infrastructure management of claim 8, further comprising conveying one copy of said digital twin model from said server to said remote telemetry unit, and wherein said server has installed thereon or is communicatively coupled to a machine learning engine that carries out said building and said confirming.

10. The method of infrastructure management of claim 9, further comprising storing said digital twin model on a memory associated with said server, and on a remote memory that is remotely located relative to said memory.

11. The method of infrastructure management of claim 1, wherein said receiving includes receiving a probability distribution function, for said instance in time or for said period of time, forecasting an amount of precipitation in said area surrounding said sensor.

12. The method of infrastructure management of claim 1, wherein in said estimating, at said server for said instance in time or for said period of time, includes using a neural network to compute one or more of said server's estimated flow attribute values and using a machine learning engine disposed inside said remote telemetry unit to compute one or more of said remote telemetry unit's estimated flow attribute values.

13. The method of infrastructure management of claim 1, wherein each of said remote telemetry unit's estimated flow attribute values and said server's estimated flow attribute values is a probability distribution function estimating said flow attribute inside said fluid infrastructure item.

14. The method of infrastructure management of claim 13, wherein said comparing is carried out at said remote telemetry unit by comparing said sensor measurement of said flow attribute with said remote telemetry unit's probability distribution function.

15. The method of infrastructure management of claim 13, wherein said reporting includes reporting, for said instance in time or for said period of time, a mean value of said server's probability distribution function as being or being an estimate of said sensor measurement of said flow attribute, if said sensor measurement, for said instance in time or for said period of time, falls within a predefined confidence interval of a mean value of said remote telemetry unit's probability distribution function.

16. The method of infrastructure management of claim 1, wherein said comparing and said reporting are carried out without conveying said sensor measurement of said flow attribute from said remote telemetry unit to said server.

17. The method of infrastructure management of claim 1, wherein said receiving includes receiving, at a periodic rate, said forecast of said environmental condition around said area surrounding said sensor;

wherein said estimating includes estimating, at said periodic rate or less than said periodic rate, said remote telemetry unit's estimated flow attribute values;

wherein said obtaining includes obtaining, at a sampling rate of said sensor, said forecast of said environmental condition around said area surrounding said sensor;

wherein said sampling rate is greater than said periodic rate.

18. The method of infrastructure management of claim 1, if said absolute value of said difference between said sensor measurement and one of said remote telemetry unit's estimated flow attribute values is greater than said predefined threshold tolerance value, or if said sensor measurement, for said instance in time or for said period of time, falls outside said predefined confidence interval of said remote telemetry unit's multiple estimated flow attribute values, then said method further comprising:

conveying, from said remote telemetry unit to said server, said sensor measurement for said instance in time or for said period of time;

receiving, after lapse of said instance in time or of said period of time and at said server, information regarding a realized environmental condition that is realized in said area surrounding said sensor for said instance in time or during said period of time;

determining, based upon said information regarding said realized environmental condition and said digital twin model present at said server, one or more server's new estimated flow attribute values for said fluid infrastructure item and for said instance in time or for said period of time;

comparing, at said server, said sensor measurement with one or more of said server's new estimated flow attribute values;

maintaining said digital twin model at said server, if said absolute value of said difference between said sensor measurement and one or more of said server's new estimated flow attribute values is equal to or greater than a check predefined threshold tolerance value, or if said sensor measurement, for said instance in time or for said period of time, falls outside a check predefined confidence interval of multiple of said server's new estimated flow attribute values.

19. The method of infrastructure management of claim 1, further comprising maintaining said digital twin model at said remote telemetry unit if said maintaining said digital twin model at said server is carried out.

20. The method of infrastructure management of claim 1, further comprising obtaining, inside each of said server and inside said remote telemetry unit, a new digital twin model that is different from said digital twin model, if said absolute value of said difference between said sensor measurement and one of said server's new estimated flow attribute is less than a check predefined threshold tolerance value, or if said sensor measurement, for said instance in time or for said period of time, falls inside said check predefined confidence interval of multiple of said server's new estimated flow attribute values, wherein said new digital twin model provides one or more estimates of said flow attribute inside said fluid infrastructure item.

* * * * *